United States Patent [19]
Condon

[11] Patent Number: 5,746,401
[45] Date of Patent: May 5, 1998

[54] UNIVERSAL PIPE HANGER WITH STRAP TIGHTENED BY BELT BUCKLE RATCHET

[76] Inventor: Duane R. Condon, 2330 Raymond Ave., Ramona, Calif. 92065

[21] Appl. No.: 404,344

[22] Filed: Mar. 15, 1995

[51] Int. Cl.[6] ............................................ E21F 17/02
[52] U.S. Cl. ............................ 248/62; 248/63; 248/74.3
[58] Field of Search ........................ 248/62, 59, 58, 248/60, 63, 71, 911, 317, 547, 74.5, 74.3; 411/525–528, 433

[56] References Cited

U.S. PATENT DOCUMENTS

| | | | |
|---|---|---|---|
| 2,354,404 | 7/1944 | Sayles | 248/214 |
| 2,452,186 | 10/1948 | Fluharty | 248/62 |
| 3,667,710 | 6/1972 | Mood | 248/71 |
| 4,768,741 | 9/1988 | Logsdon | 248/62 |
| 5,221,064 | 6/1993 | Hodges | 248/62 |
| 5,344,112 | 9/1994 | Peterson | 248/74.3 |
| 5,390,882 | 2/1995 | Lee | 248/74.3 |

Primary Examiner—Leslie A. Braun
Assistant Examiner—Gwendolyn W. Baxter
Attorney, Agent, or Firm—Baker, Maxham, Jester & Meador

[57] ABSTRACT

A universal pipe hanger strap for hanging a pipe to a building structure comprises an elongated flexible strap for encircling a pipe, the strap having first and second ends and a plurality of ratchet teeth along at least the sides thereof, a ratchet buckle on the first end of the strap for receiving the second end of the strap, and having latching pawls latchingly engaging the teeth, and a universal attachment bracket spaced intermediate the first and second ends, the attachment bracket having a plurality of slots for receiving a hanger bar in multiple orientations, and a bore for receiving a hanger rod.

4 Claims, 5 Drawing Sheets

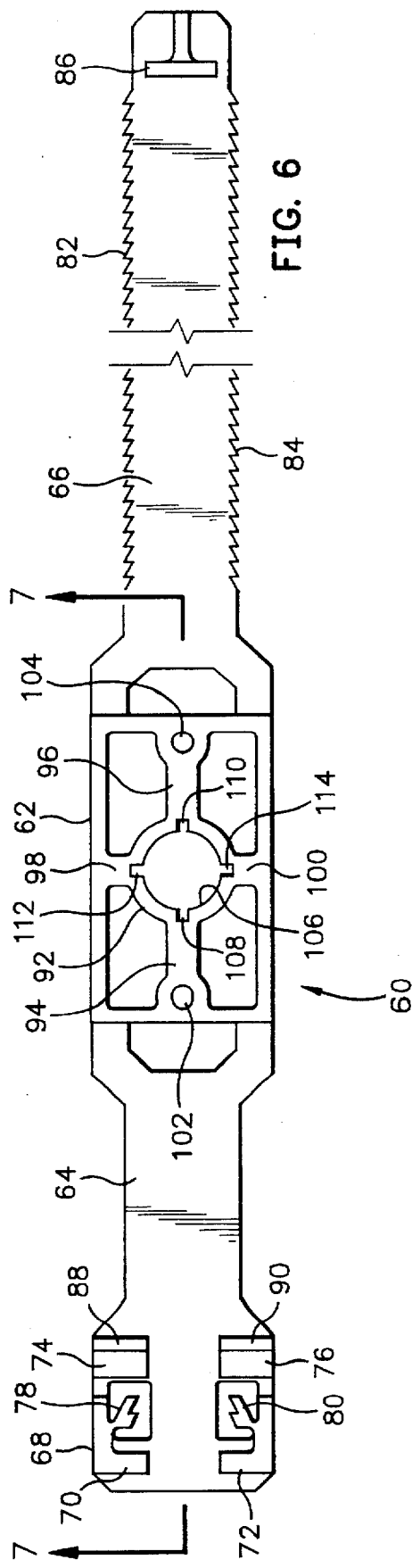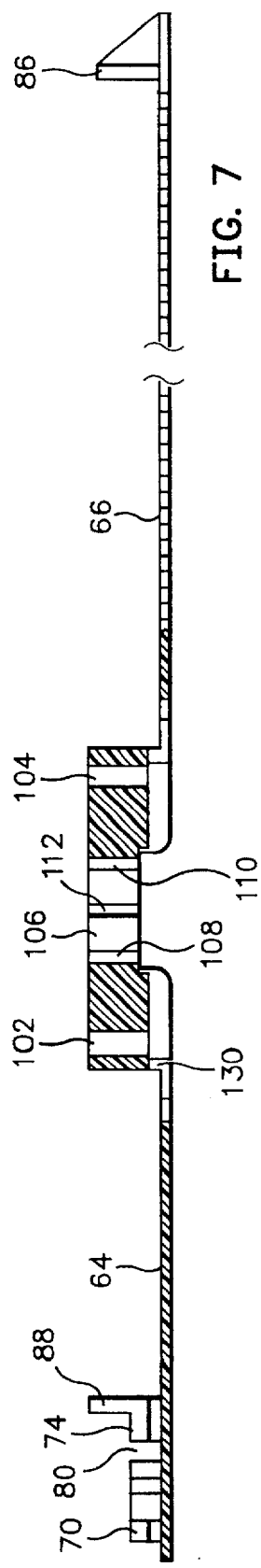

5,746,401

UNIVERSAL PIPE HANGER WITH STRAP TIGHTENED BY BELT BUCKLE RATCHET

BACKGROUND OF THE INVENTION

The present invention relates to building construction, and more particularly, to a hanger for supporting water, gas, or waste pipes by attachment to wooden supports such as floor joists and wall studs.

In constructing houses and buildings with a wooden framework it is common to run pipes beneath a number of spaced apart, parallel floor joists. It is not practical to drill aligned holes in the joists for receiving the pipe therethrough. Drilling is too time consuming, and can lead to violations of local building codes that guard against undue weakening of wooden supports.

One common way of suspending pipes from joists is to utilize segments of sheet metal or plastic strapping having a series of holes punched therethrough. Segments of this strapping are wrapped around the pipe at spaced intervals and nailed to the joists. The pipe is still free, in many cases, to move upwardly or laterally, which is undesirable. Another common method of installation of piping requires the utilization of individual pipe hangers. These typically have a J-type configuration and are made of metal or plastic. The longer leg or stem of the J-type hanger is nailed to the stud and the pipe is received in the curved portion of the hanger. The J-type hangers must be manufactured in different sizes to accommodate various pipe diameters.

Normally copper water pipes have a slight incline to allow water to drain from the pipes prior to brazing the joints. Waste pipes are also required by code to have an incline of one-eighth of an inch per foot and typically must be supported at regular increments, such as every four feet along their length. This makes it necessary to secure pipe hangers to joints at graduated heights to allow for drainage.

One example of a J-type pipe hanger is disclosed in U.S. Pat. No. 4,407,478 of Hodges and is illustrated in FIG. 1. This pipe hanger 10 has four-sided stem 12 with a series of holes 14 and 16 which extend orthogonally through the stem. This permits the pipe hanger 10 to be nailed to a joist 18 so that the pipe 20 will either extend parallel to the joist, or perpendicular thereto. The stem 12 also has graduated markings 22 to facilitate mounting of a pipe with the proper grade. The curved portion 24 of the pipe hanger 10 has a protrusion (not visible in FIG. 1) at the junction of the curved and straight portions so that the pipe can be snap fit into the curved portion 24 and retained thereby.

The J-type pipe hanger of U.S. Pat. No. 4,407,478 has been sold under the trademark "J-hook" by J-Hook Industries of Grand Rapids, Mich. A principal drawback of the J-hook pipe hanger is that the pipe cannot be suspended so that it runs at an acute angle relative to the joists. In many cases, it is desirable to suspend pipe beneath joists so the pipe extends diagonally relative to the joists. Such a diagonal arrangement of the pipe is often the shortest route between two locations in a building construction.

Another prior art J-type pipe hanger has been sold under the trademark "RSH" by IPS Corporation of Collierville, Tenn. and is illustrated in FIG. 2. The RSH pipe hanger 26 has a stem 28 which is snap fit through a bore 30 (FIG. 3) in a block 32 integrally molded with the curved portion 34 of the hanger. The upper portion 28a of the stem 28 has a square cross-section. The lower portion 28b of the stem has a round cross-section. The rounded lower portion 28b of the stem permits the curved portion 34 of the hanger 26 to rotate relative to a joist 36. The stem 28 only has holes 38 (FIG. 2) which extend therethrough in one direction. Once the rectangular upper portion 28a of the stem 28 is nailed to the joist 36, the curved portion 34 can be rotated so that the pipe 40 may run parallel to the joist 36, perpendicular to the joist 36, or at an acute angle relative to the joist 36.

The principal drawback of the RHS pipe hanger 26 (FIG. 2) is that the curved portion 34, which is attached to the mounting block 32, is spaced too far from the side surface of the joist 36. Thus, the pipe 40 is supported in cantilever fashion. With large and/or heavy pipe, the pipe hanger 26 can bend downwardly as illustrated in FIG. 3. In some cases this bending permits the pipe 40 to fall out of the curved portion 34. Another problem with the RSH pipe hanger is that the mounting block 32 has a cross-section which is substantially larger than the rectangular cross-section of the upper stem portion 28a. Because of this the RSH hanger 26 cannot be mounted flush with the surface of the joist 36. This drawback, which is illustrated in FIG. 4, also results in bending of the stem 28 which can lead to breakage. Also, if the fit between the rounded lower portion 28b of the stem 28 and the bore 30 is too loose, the curved portion 34 will not maintain a selected rotational position after the stem 28 is nailed to the joist 36 and before the pipe 40 is placed into the curved portion 34.

U.S. Pat. No. 4,768,741 discloses a pipe hanger 42 (FIG. 5) having a vertical support rod 44 whose lower end is connected to a yoke 46 that supports a strap 48. The strap is wrapped around the pipe and its toothed end is inserted into a ratchet slot 50 in the body of the yoke and drawn tight. This type of pipe hanger has been sold under the trademark "Hang'em" by LSP Specialty Products Company of Stanton, Calif. The Hang'em product is quite serviceable, however, it is difficult to nail or screw through the rod which has no holes. More importantly, however, the T-shaped configuration of the Hang'em product is not readily adaptable to a wide variety of pipe hanging configurations, e.g. between floor joists directly beneath the floor, and not suspended below the joists, and to vertical studs, pilings and the like.

SUMMARY OF THE INVENTION

It is therefore the primary object of the present invention to provide an improved pipe hanger for supporting water, gas or waste pipes by attachment to wooden supports such as floor joists.

Another object of the present invention is to provide an improved pipe hanger which takes the place of several different types of conventional pipe hangers.

In accordance with a primary aspect of the invention, a pipe hanger for hanging a pipe to a building structure comprises an elongated flexible strap for encircling a pipe, said strap having first and second ends and a plurality of ratchet teeth along at least one side thereof, a ratchet buckle on said first end of said strap for receiving said second end of said strap, and having latching pawl means for latchingly engaging said teeth, and a universal attachment bracket spaced intermediate said first and second ends, said attachment bracket having a plurality of slots for receiving a hanger bar in multiple orientations, and a socket for receiving a hanger rod.

BRIEF DESCRIPTION OF THE DRAWINGS

FIG. 6 is a top plan view of an exemplary embodiment of a pipe hanger in accordance with the present invention.

FIG. 7 is a side elevation view partially in section of the embodiment of FIG. 6.

DESCRIPTION OF THE PREFERRED EMBODIMENT

Figure 1:
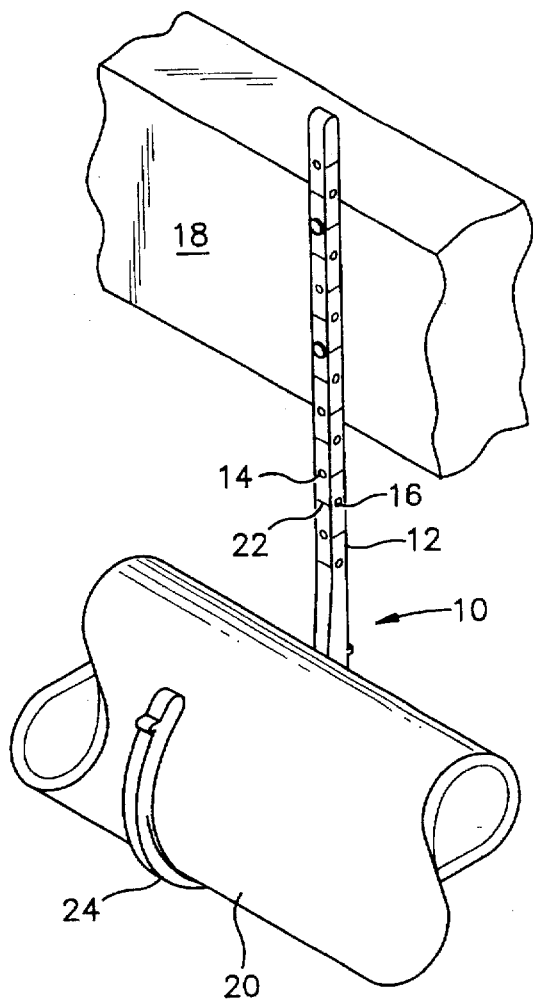
FIG. 1 is a perspective view of a first prior art pipe hanger nailed to a joist and supporting a pipe.
Figure 2:
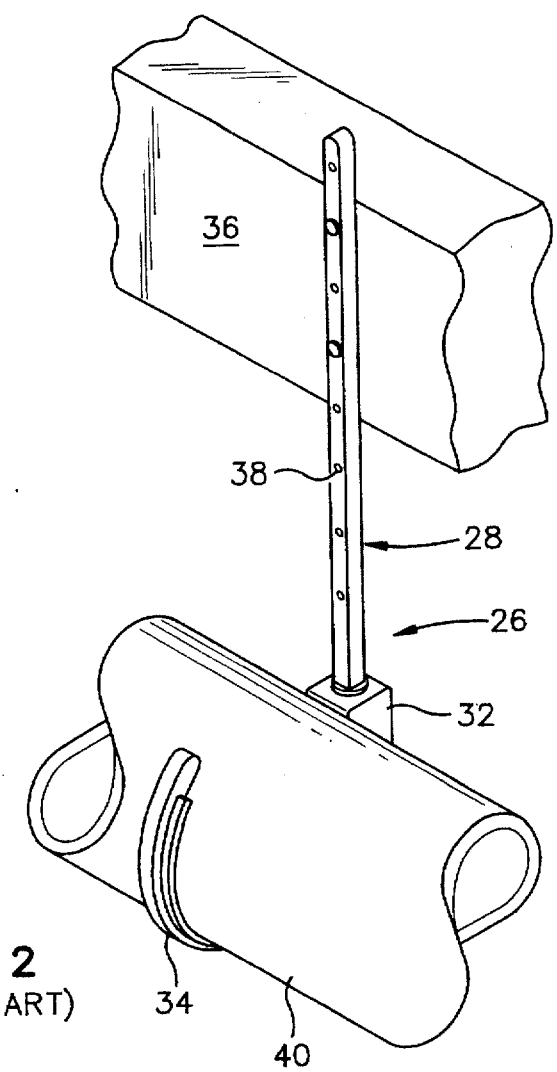
FIG. 2 is a perspective view of a second prior art pipe hanger nailed to a joist and supporting a pipe.
Figure 3:
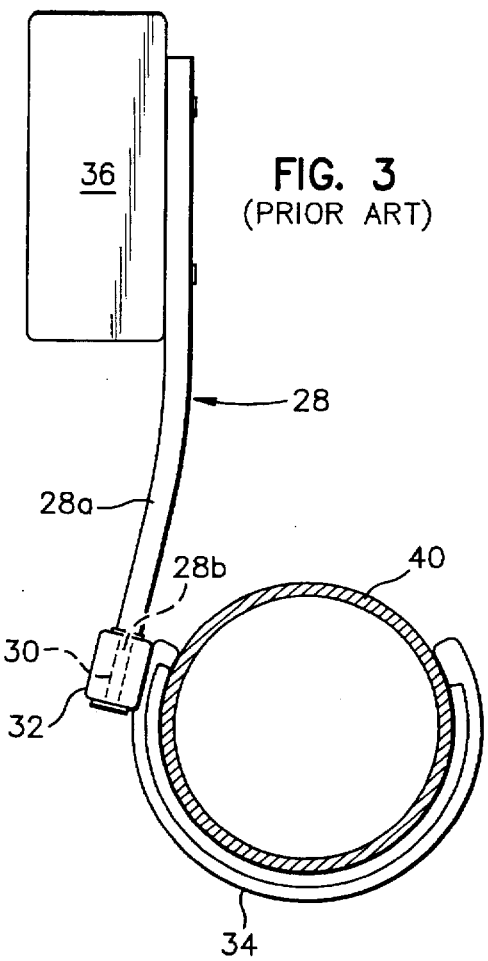
FIGS. 3 and 4 are side elevation views of the second prior art pipe hanger illustrating alternate attachments to a joist which show sagging, and non-flush mounting, respectively.
Figure 4:
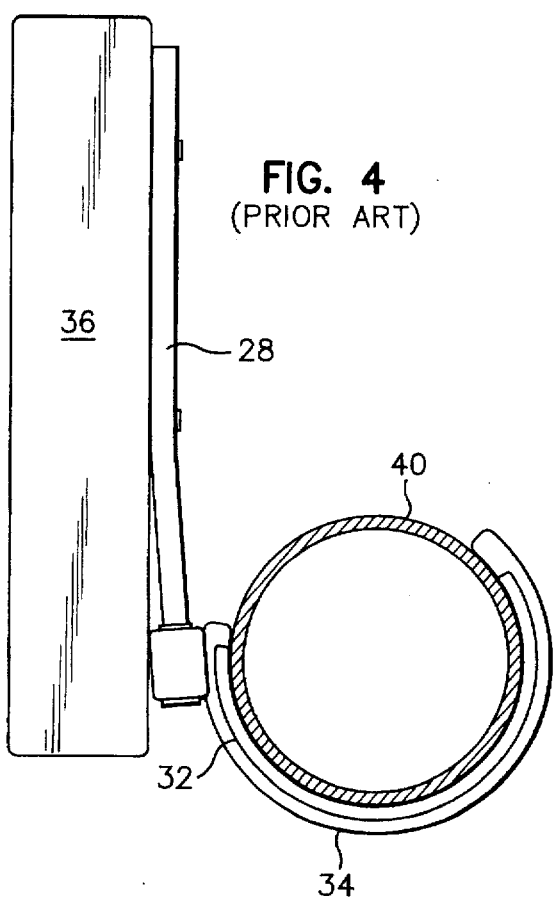
Figure 5:
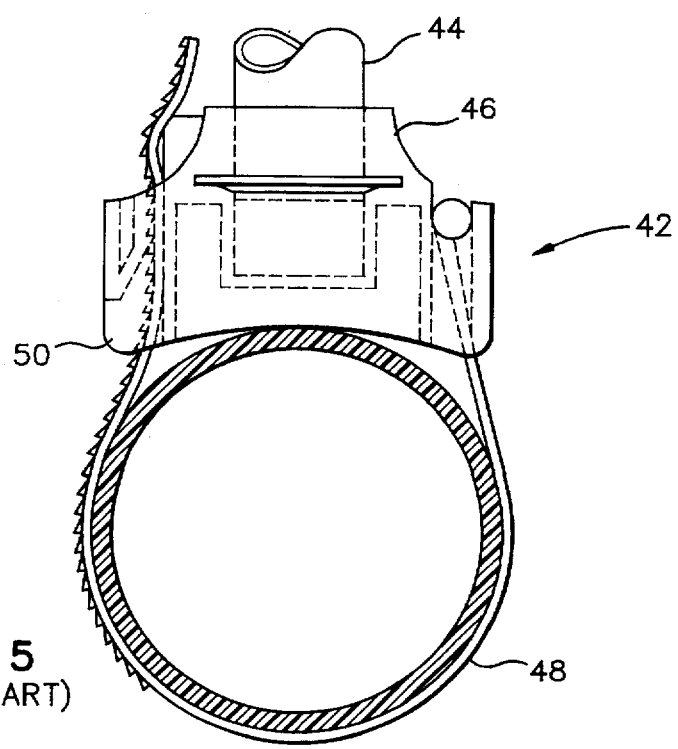
FIG. 5 is a side elevation view of a third prior art pipe hanger that has a strap and belt buckle ratchet.

Referring to FIGS. 6 and 7 of the drawing, a universal pipe hanger in accordance with the invention is illustrated in top plan view and designated generally by the numeral 60. The overall hanger comprises a generally elongated flexible strap for encircling a pipe and including a central universal attachment bracket 62 with a first elongated strap section 64 extending from one end thereof, and a second elongated strap section 66 extending from the other end thereof. The hanger is a combination of an attachment bracket 62 and the flexible strap sections 64 and 66. The first strap section 64 has an end with a ratchet buckle 68 for receiving the end of the second strap section 66 for latching it around a pipe.

The ratchet buckle 68 is formed with a guide slot for receiving strap section 66 with the guide slot formed beneath a pair of forward guide members 70 and 72 and a pair of rearward guide members 74 and 76. These guide members overlap the side edges of the strap section 66 for retaining it in place for engagement with ratchet pawls 78 and 80. The strap section 66 is formed with saw-tooth like ratchet teeth 82 and 84 along the respective sides thereof for latching engagement with the pawls 78 and 80 of the ratchet buckle 68. More pawls can be provided for extra gripping force. The strap section 66 is provided with one or more outwardly extending tab member 86 which along with similar tabs 88 and 90 on the opposite end provide means for grasping the end of strap section 66 and pulling it into latching engagement with the ratchet buckle 68. Special tools may be utilized between these tabs for tensioning the strap around a pipe. The bracket-strap combination may be constructed of any suitable flexible high-strength plastic material, such as nylon, polyethylene or polypropylene. It may be conveniently injection molded with any one of these or other equivalent plastic materials.

The attachment bracket 62 (FIG. 6) is constructed of a generally rectangular box-like open frame construction with a generally peripheral rectangular frame supporting an inner hub 92 by means of radial arms 94, 96, 98 and 100. The arms 94 and 96 extend along the longitudinal axis of the strap sections 64 and 66. The arms 98 and 100 extend transverse to this axis. The attachment bracket 62 has a generally planar top surface with a pair of through bores 102 and 104 provided in arms 94 and 96 for direct attachment to a stud or the like by means of screws, nails or similar attachment devices. The bores 102 and 104 align with holes in a HYCO (Trademark) strap to facilitate attachment thereto.

Figure 8:
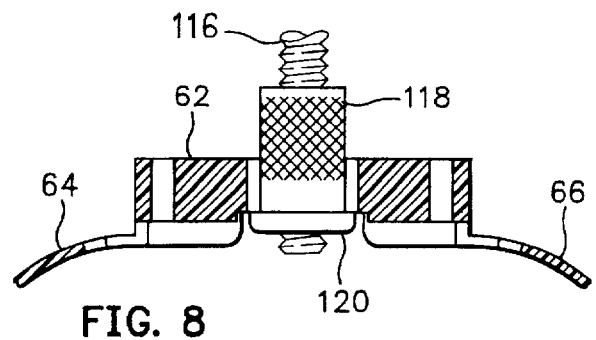
FIG. 8 is a side elevation view in section illustrating the hanger of FIG. 6 supported by a hanger rod.

The central hub 92 is provided with a central through bore or socket 106 for a receiving and being supported by a universal hanging rod 116 of the type sold under the trademark SUPERSTRUT, as shown in FIG. 8. This type hanging rod comprises an elongated threaded rod having a knurled nut 118 with flange 120 on a lower end. The flange on the nut fits in a recess beneath the bracket. The upper end of the rod is supported by a connector (not shown) to floor joists or other support structure.

Figure 9:
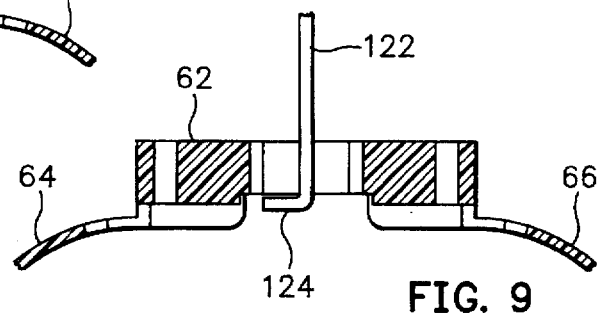
FIG. 9 is a view like FIG. 8 illustrating the hanger of FIG. 6 supported by a hanger bar.
Figure 10:
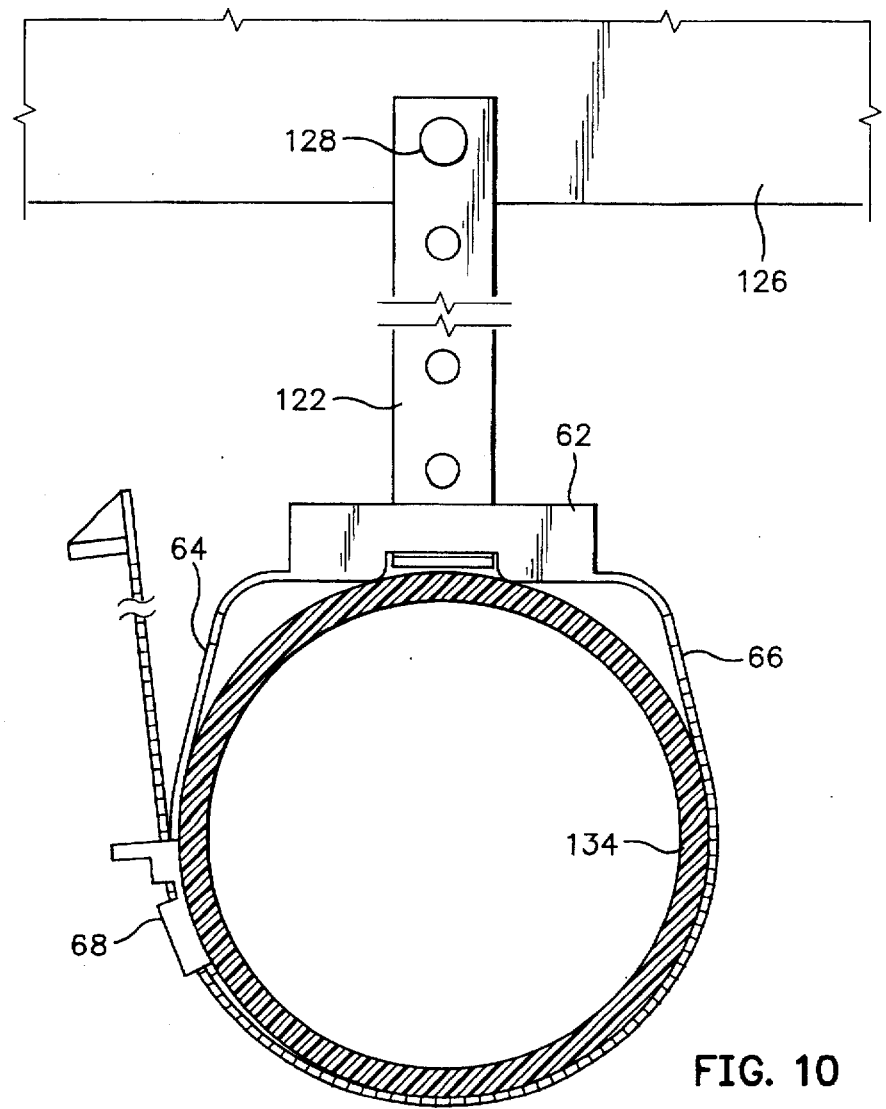
FIG. 10 is a detailed side elevation view illustrating the hanger of FIG. 6 in use supporting a pipe.

The through bore 106 is also provided with opposed pairs of slots 108, 110, 112 and 114 (FIG. 6) for receipt of a perforated HYCO metal bar 122 frequently used in building, as shown in FIGS. 9 and 10. These bars are typically about 5/8th of an inch wide and about 0.60 inches in thickness and have holes at about 13/16 inch intervals along their length. Referring to FIG. 9, the bar 122 is shown inserted in the bore in opposed slots 108 so that it is transverse to the longitudinal axis of the strap sections 64 and 66 of the hanger. A lower end of the bar has a ninety degree bend forming a leg 124 for engaging a bottom surface of the bracket for supporting it. In this configuration, the pipe extends parallel to the joist. It may also be angled to insert through the pairs of slots 110 for positioning the bar for attachment to a floor joist 126 or the like as shown in FIG. 10. The bar 122 is shown attached by a nail 128 to the joist 126. The hanger is shown with strap encircling a pipe 134 for supporting it beneath the joist 126 and extending transverse thereto. The pipe 134 may be, for example, a 1½ inch, 2 inch, 3 inch or 4 inch ABS drain-waste-vent (DWV) pipe. The bar 122 may be inserted into opposed slots 112 or 114 to orient it at forty-five degrees relative to the joist 126.

Figure 11:
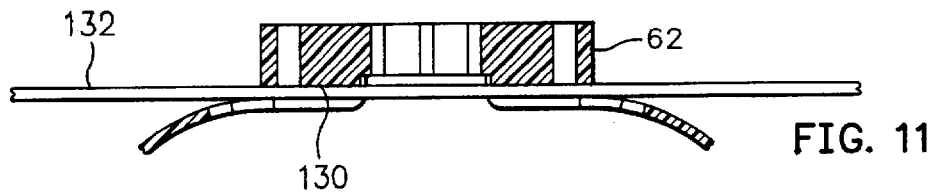
FIG. 11 is a view like FIG. 9 illustrating the hanger of FIG. 6 supported by the hanger bar in a different orientation.
Figure 14:
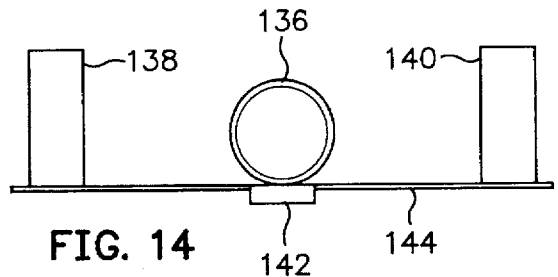
Figure 15:
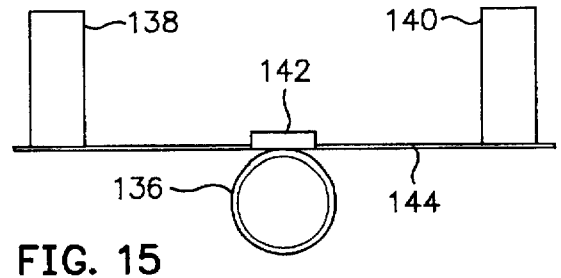

The universal pipe hanger 60 is also formed with a rectangular slot 130 (FIG. 7) extending between the bracket 62 and the strap sections for longitudinally receiving a bar 132 extending generally parallel to the strap sections. The bar 132 may be a segment of HYCO strap which is slid through the slot 130 as best seen in FIG. 11. This configuration permits various arrangements for attachment of the hanger 60 between studs or joists of a building structure such as schematically illustrated in FIGS. 12–15. The pipe can, as illustrated, be above or below the strap such as that it may be suspended above the bottom of the joists as in FIGS. 12 and 14. It may also below the lower edges of the floor joists as shown in FIGS. 13 and 15.

Figure 12:
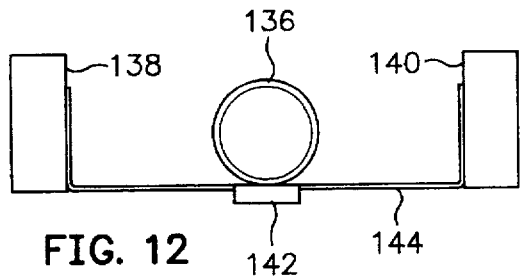
FIGS. 12–15 are schematic illustrations of various arrangements of the hanger supporting a pipe on a support bar between a pair of joists.
Figure 13:
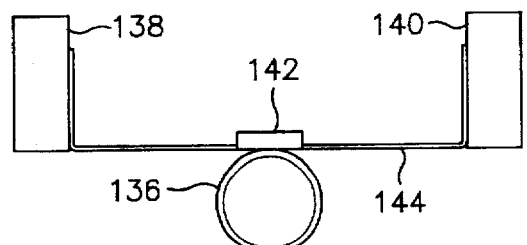

As illustrated in FIG. 12, a pipe 136 is suspended between a pair of joists 138 and 140 by a hanger 142 connected to a bar 144 as illustrated in FIG. 11. The ends of the bar are bent upward at ninety degrees so that they may be attached to the sides of the joists and position the pipe at any vertical location between the joists. In FIG. 13 the pipe is below the bar 144 and the lower edge of the joists and may be vertically positioned by the attachment to the sides of the joists. Referring to FIGS. 14 and 15, the bar 144 is secured to the bottom of the joists and the pipe is either above or below the bar. This positions the pipe either above or below the lower edge of joists.

Figure 16:
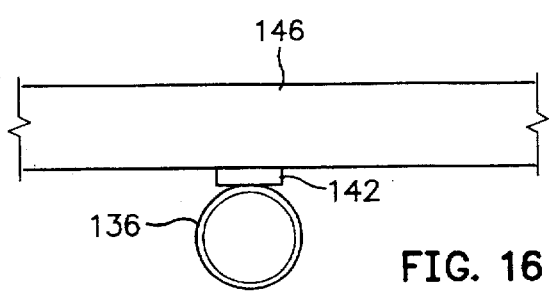
FIGS. 16 and 17 illustrate a hanger of FIG. 6 supporting a pipe and secured directly to a joist and stud, respectively.
Figure 17:
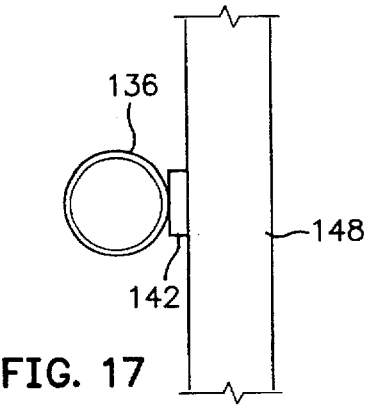

Referring to FIG. 16, the hanger 142 is shown securing the pipe 136 directly to and beneath a joist 146. FIG. 17 illustrates a similar attachment of the pipe 136 by hanger 142 directly to a side of a vertical stud 148. The arrangements illustrated in FIGS. 16 and 17 do not require any mounting bar.

Figure 18:
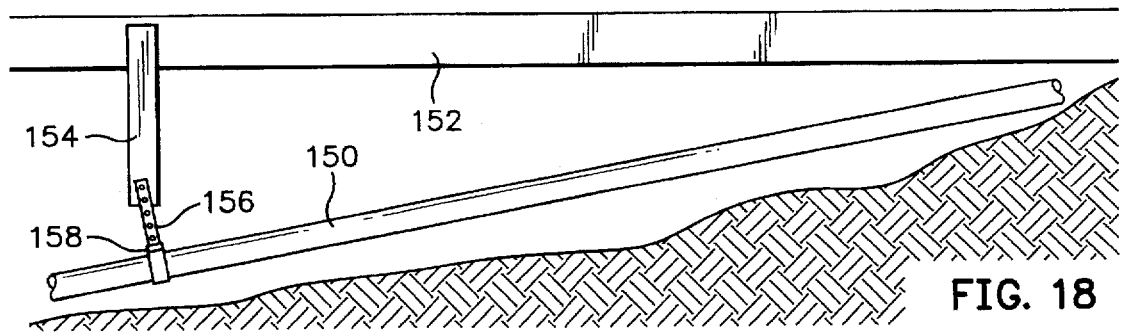
FIG. 18 illustrates the use of the hanger of FIG. 6 and a hanger bar to support a pipe in another arrangement.

Another arrangement is illustrated in FIG. 18, wherein a drain pipe 150 having a long run and steep slope is shown supported beneath a floor from a joist 152. A support beam 154 is secured to and extends below joist 152 to which a hanger bar 156 supporting a hanger 158 is attached.

The arrangements illustrated in FIGS. 12–18 demonstrate the versatility of my pipe hanger invention. It provides a single hanger that can be used in substantially any situation encountered by a plumber.

While I have illustrated and described my invention by means of specific embodiments, it is to be understood that numerous changes and modifications may be made therein without departing from the spirit or the scope of the invention as defined in the appended claims.

I claim:

1. A universal pipe hanger for mounting a pipe to a building structure comprising:

an elongated flexible strap for encircling a pipe, said strap having first and second ends and a plurality of ratchet teeth along at least one side edge thereof;

a ratchet buckle on said first end of said strap for receiving said second end of said strap, and having latching pawls for latchingly engaging said teeth; and a universal attachment bracket spaced from said first end, said universal attachment bracket having a generally box-like open frame including a plurality of slots for receiving a hanger bar in multiple orientations, and a bore formed in a hub centrally of said frame by means of a plurality of arms, said bore extending normal to said strap for receiving a hanger rod, a pair of first slots of said plurality of slots being disposed adjacent said bore in opposed relation transverse to said strap for receiving the hanger bar, a pair of second slots of said plurality of slots disposed adjacent said bore in opposed relation longitudinally to said strap for receiving the hanger bar, and a third slot extending parallel to said strap for receiving the hanger bar.

2. A pipe hanger according to claim 1 wherein said universal attachment bracket includes holes in a plurality of said arms extending at a right angle to said strap for receiving nails and screws.

3. A universal pipe hanger for mounting a pipe to a building structure comprising:

an elongated flexible strap for encircling a pipe, said strap having first and second ends and a plurality of ratchet teeth along both side edges thereof;

a ratchet buckle on said first end of said strap having a slot for receiving said second end of said strap, and having a latching pawl at each side thereof for latchingly engaging said teeth; and a universal attachment bracket spaced from said first end, said attachment bracket having a generally rectangular box-like open frame construction, a hub disposed centrally of said frame and supported by a plurality of radially extending arms, a central bore in said hub extending normal to said strap for receiving a hanger rod, a first pair of slots in said bore disposed in opposed relation transverse to said strap, and a second pair of slots disposed in opposed relation longitudinally to said strap for receiving the hanger bar in multiple orientations.

4. A pipe hanger according to claim 3 wherein said universal attachment bracket includes holes in a plurality of said arms extending at a right angle to said strap for receiving nails and screws.

* * * * *